United States Patent [19]

Segawa et al.

[11] 4,154,876
[45] May 15, 1979

[54] COATING WITH FLUOROETHYLENE RESINS

[75] Inventors: Masahiro Segawa; Morio Shirai; Yukichika Kawakami, all of Iwaki, Japan

[73] Assignee: Kureha Kagaku Kogyo Kabushiki Kaisha, Tokyo, Japan

[21] Appl. No.: 703,113

[22] Filed: Jul. 6, 1976

[30] Foreign Application Priority Data

Jul. 4, 1975 [JP] Japan .................... 50-81962
Jul. 23, 1975 [JP] Japan .................... 50-89131

[51] Int. Cl.$^2$ .............................. B05D 3/02
[52] U.S. Cl. .................... 427/195; 427/202; 427/375; 427/407 F; 428/421
[58] Field of Search ........... 427/195, 202, 204, 205, 427/375, 407 F; 428/421

[56] References Cited

U.S. PATENT DOCUMENTS

| | | | |
|---|---|---|---|
| 2,738,343 | 3/1956 | Dittman et al. | 428/421 X |
| 2,768,925 | 10/1956 | Fay | 428/421 X |
| 2,919,213 | 12/1959 | Puppolo | 428/421 X |
| 2,951,783 | 9/1960 | Landrum et al. | 428/421 X |
| 2,979,418 | 4/1961 | Dipner | 428/421 X |
| 2,990,294 | 6/1961 | Long | 427/375 X |
| 3,170,811 | 2/1965 | Sands | 428/421 |
| 3,227,637 | 1/1966 | DeHart | 428/421 X |
| 3,502,498 | 3/1970 | Petriello et al. | 427/375 X |
| 3,824,115 | 7/1974 | Segawa et al. | 427/201 |
| 3,859,119 | 1/1975 | Fletcher | 428/421 X |
| 3,920,793 | 11/1975 | Teti et al. | 427/195 X |
| 3,940,518 | 2/1976 | Bowler et al. | 428/422 X |
| 3,968,069 | 7/1976 | Grimand | 428/421 X |

*Primary Examiner*—Shrive P. Beck
*Attorney, Agent, or Firm*—Wenderoth, Lind & Ponack

[57] ABSTRACT

A porous fluoroethylene resin coating on a substrate is obtained by coating a substrate with an aqueous dispersion paint comprising a particulate fluoroethylene resin, inorganic water-insoluble powder and an aqueous medium, drying the coated paint, and heating the coated surface to a temperature of not lower than the melting point of the resin. In another embodiment, a fluoroethylene resin powder is further applied onto the above-mentioned baked coating when the coating is in a molten state, followed by heating the resin powder to a temperature of not lower than the melting point thereof to obtain an anti-corrosive surface coating.

6 Claims, 2 Drawing Figures

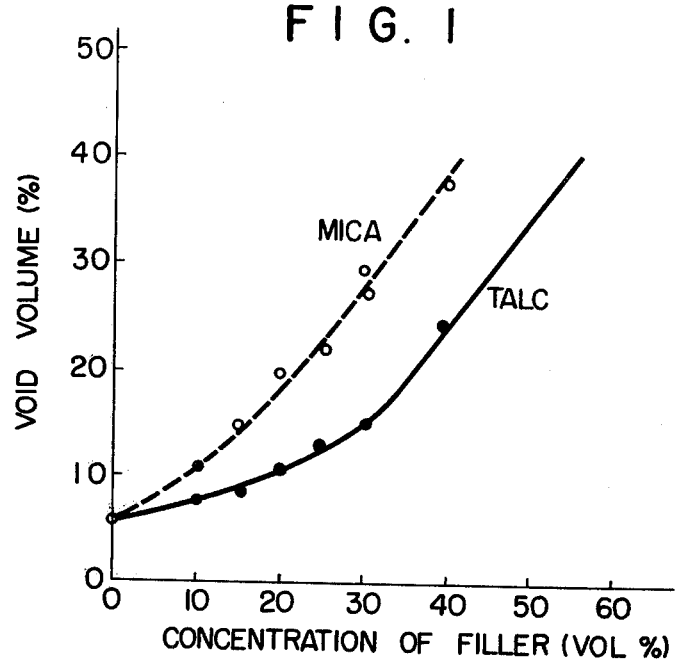
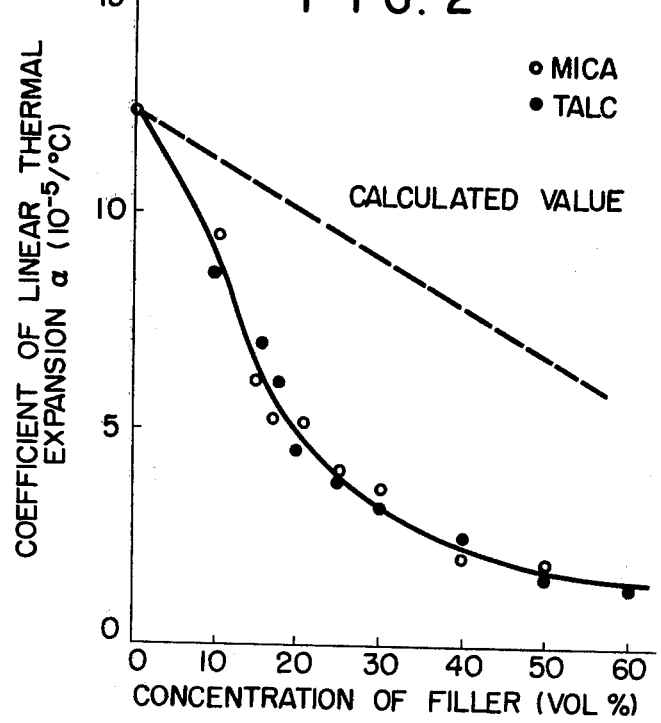

COATING WITH FLUOROETHYLENE RESINS

BACKGROUND OF THE INVENTION (a) Field of the Invention

This invention relates to a method for coating on a substrate an aqueous paint comprising a dispersion of a fluoroethylene homopolymer or copolymer resin alone or together with an inorganic filler in an aqueous medium, a method for coating on the above-mentioned coating layer (used as a primer layer) a fluoroethylene resin, and a structure of the resulting coating film.

(b) Description of the Prior Art

Fluoroethylene resins, i.e., homopolymers of a fluoroethylene or copolymers comprising a major amount of a fluoroethylene such as tetrafluoroethylene, trifluoroethylene, vinylidene fluoride and trifluoromonochloroethylene have excellent chemical resistances, as well-known, to most acids and alkalis, halogen gases, oxidative chemicals, organic solvents such as halohydrocarbons, and the like. The resins are mechanically strong in that they have large tensile strength and impact strength, and excellent creep resistance and abrasion resistance. Furthermore, they are thermally stable in that fusion temperature is in the range of 150°–320° C. and decomposition temperature is in the range of 200°–340° C. In other words, it is expected from these properties that fluoroethylene resins are very preferable materials for the anti-corrosive coating onto chemical process apparatus.

As to the methods for coating with fluoroethylene resins, there are known the method for coating with the resin dispersed in organic solvents such as an organosol, the method for coating with the aqueous latexes and the method for powder coating with the dry resin powder.

The organosol method which employs organic solvents has the defects in that workers may be exposed to harmful vapors of the solvents upon coating operations and fire is apt to occur. The aqueous latex becomes unstable at a higher concentration of the resins. It is required to use a large amount of emulsifiers in order to increase emulsion stability of the latex. The problems reside in that a general emulsifier is apt to decompose at a temperature for coating with fluoroethylene resins and a perfluororesin acid type emulsifier having good thermal stability is very expensive. A latex of lower concentration is generally employed. When such a dilute latex is applied onto a perpendicular wall, a very thin coating film is obtained by each coating operation since such latex is of low viscosity and easily flows down the wall. For example, in order to obtain a coating film as thick as 1 mm, the operation of coating—drying—baking must be repeated for several tens of times.

The method for powder coating is most suitable for obtaining relatively thick coating film by one coating operation. The powder coating method has also some defects given below.

The apparatus which is to be used at a relatively low temperature and a dry state may be coated with fluoroethylene resins alone. But, the chemical process apparatus which is to be used under corrosive circumstances of high temperature and high humidity suffers from the following troubles, even if the coated resin film does not undergo corrosion or swelling.

One of the troubles is that the coating film on a substrate having concave sufaces peels off at its concave surfaces and the peeling spreads outside. Another trouble is that a lot of blisters are produced and the coating peels off from the surface of the substrate as the blisters grow. These defects cause a decrease in the durable life of the coated apparatus. Various efforts to depress the formation of blisters have been made. For example, a primer coating layer has been placed between an anti-corrosive coating layer and a substrate. In this case, the primer coating layer should have a good bonding property to the anti-corrosive surface coating layer. In the primer coating layer is generally employed the resin of the same kind as the surface coating resin or the resin having good compatibility therewith. The powder coating method may sometimes be applied to a primer coating layer. It is generally difficult to form a uniform coating film on a curved or uneven surface with the powder coating method. Therefore, the method is generally not suitable for forming a relatively thin primer coating.

Such peeling off is apt to occur when the coating film is thicker and when the substrate has a curved surface of a large curvature. The coefficient of thermal expansion of thermoplastic resins is generally about 10 times as large as that of metals. Therefore, a large strain owing to the difference in thermal expansion takes place at the bonding surface between the metal substrate and the coating resin layer when temperature changes. Thus, the coating resin layer peels off. In this case, the thicker the coating film is, the larger the strain on the bonding surface. The strain is concentrated into the place having a large curvature. Accordingly, a relatively thick coating film is formed by the powder coating method, and peeling off is most liable to occur.

The intensive efforts to enhance bonding strength between the resin and a substrate have hitherto been made for the purpose of eliminating formation of blisters. But, it seems that such enhancement of bonding strength scarcely serves to prevent blisters. In other words, peeling between a substrate and a coating film due to formation of blisters often depends on cracks in the resin film itself which takes place in the vicinity of the bending portion therebetween. Therefore, the enhancement of bonding strength by itself would not solve the problems.

The present inventors developed the following hypothesis. Small cracks are at first produced at the bonding surface between a substrate and a coating layer or at the resin layer in the vicinity thereof owing to the difference in thermal expansion between a fluorinated thermoplastic resin and a metal substrate. Water or a chemical liquid may more or less permeate into a synthetic resin. Since a very small amount of a chemical liquid or water can permeate into a fluoroethylene thermoplastic resin having no pinholes, the chemical liquid penetrates into the pores in the resin layer for a long period of time, which were formed by cracks in the resin layer. The chemical liquid which has penetrated into the pores expands the pores due to liquid expansion on elevation of its vapor pressure at an elevated temperature. When temperature falls, the resulting reduced volume of pressure facilitates penetration of the chemical liquid into the expanded pores. When the vaporization and condensation of the chemical liquid are repeated, there occurs a very large difference in pressure. Owing to the repeated vaporization and condensation, blisters may grow for a long period of time to result in peeling of a coating, or blistered portions may produce holes owing to repeated strains at the blistered portions.

From the above mentioned points of view, sufficient voids were given to the primer layer of a coating film. Thus, the difference in thermal expansion can be absorbed by the voids, and air contained in the voids can moderate the elevation of vapor pressure caused by the penetrated chemical liquid. Formation of blisters can be regulated by these synergistic effects. It has some effects on the regulation of blisters to incorporate an inorganic powder having a small coefficient of thermal expansion into a primer layer and decrease the average coefficient of thermal expansion of the mixed composition comprising the inorganic powder and resin. In this case, the bonding strength to a substrate is naturally decreased when the porous primer layer is employed. It is considered, however, that the coating film is substantially prevented from peeling by regulating formation of blisters.

SUMMARY OF THE INVENTION

An object of the invention is to provide a novel method for coating with a slurry or paste type aqueous dispersion paint of fluoroethylene resins in which no organic solvent is employed.

Another object of the invention is to provide a novel method for a corrosion-resistant coating of fluoroethylene resins which are firmly bonded even to a metal substrate having concave surfaces and do not produce blisters even when the coating is exposed to a high temperature and high moisture for a long period of time, said method comprising applying the above-mentioned aqueous dispersion paint to a substrate as a primer coating and then applying a surface coating thereonto with a fluoroethylene resin powder.

Still another object of the invention is to provide a corrosion-resistant coating of fluoroethylene resins which can readily and safely be applied to a substrate.

Further object of the invention is to provide the structure of a fluoroethylene resin coating on which blisters scarcely come out, said structure comprising a porous primer coating layer and a surface coating layer having no substantial void.

These objects of the invention have been fulfilled by the present invention, which comprises:

(i)

(a) coating with an aqueous fluoroethylene resin dispersion paint the surface of a substrate; said dispersion paint comprising the particulates, having a particle size of about 0.03–2$\mu$, of a fluoroethylene resin selected from a fluoroethylene polymer and a copolymer of a fluoroethylene as major comonomeric component and a copolymerizable monomer therewith, inorganic solid powder which is substantially water-insoluble and has a geometric average particle size of about 0.03–100$\mu$, and an aqueous medium; said particulates and said powder being employed in a volume ratio of about 40–100/60-0, and being dispersed in an aqueous solution containing about 0.1–10% by weight of a water-soluble high-molecular suspension agent, and the solid content therein being about 10–60% by weight;

(b) drying the coated paint; and (c) forming a coating film by heating the coated surface of the substrate to a temperature of not lower than the fusion temperature of the fluoroethylene resin: or (ii)

(a) forming a primer layer about 10–50$\mu$ thick on a substrate according to the procedure mentioned above in (i), the volume ratio of fluoroethylene resin to inorganic solid powder being about 40–80/60-20;

(b) coating a primer layer which is in a molten state with the powder having a particle size of about 10–300$\mu$ of a fluoroethylene polymer and/or copolymer which can undergo deposition on the primer layer and may be identical with or different from the fluoroethylene resin employed in the primer layer; and (c) heating the coated resin powder to a temperature of not lower than the fusion temperature of the resin powder to form a surface coating layer about 50–3,000$\mu$ thick;

(d) if desired, the procedures of coating with the fluoroethylene resin powder and heating may be repeated to obtain the surface coating layer.

In accordance with an embodiment of the present invention there is provided a fluoroethylene resin coating film on a substrate, which comprises a porous primer coating layer having a void volume of about 10-40% which consists substantially of about 20-60 parts by volume of an inorganic filler and about 80-40 parts by volume of a fluoroethylene resin, and a surface coating layer having no substantial void and consisting substantially of a fluoroethylene resin which may be identical with or different from the resin employed in the primer coating layer and has a thermal bonding property to the resin.

Incidentally, the term "volume ratio" appearing above in the procedure (i) (a) means the ratio of calculated volumes, and the calculated volume is a quotient of the weight of the resin divided by its true specific gravity.

DESCRIPTION OF THE DRAWINGS

FIG. 1 is a graph showing the relation between concentration of filler and void volume (%) in the present invention.

FIG. 2 is a graph showing the relation between concentration of filler and coefficient of linear thermal expansion in the present invention.

DESCRIPTION OF THE PREFERRED EMBODIMENTS

The fluoroethylene resin aqueous dispersion paint to be employed in the present invention is an aqueous dispersion paint having a solid content of about 20–60% by weight, which can be prepared by dispersing about 40–100 parts by volume of a fluoroethylene resin having a particle size of about 0.03–2$\mu$ prepared via emulsion polymerization and about 60-0 parts by volume of inorganic solid powder which has an average particle size of about 0.03–100$\mu$ and is substantially water-insoluble onto an aqueous solution containing about 0.1–10% by weight of a water-soluble high-molecular suspension agent.

The inorganic solid powder to be employed should be substantially insoluble in water since it is to be suspended in water. Furthermore, inorganic powder is preferably such as does not impair the thermal stability of the fluoroethylene resin to a large extent. The inorganic solid materials include fillers or pigments which can generally be employed for plastics, such as talc, clay, diatomaceous earth, Sirasu earth (a volcanic earth), silica sand, mica, vermiculite, lime stone, quartz, feldspar, gypsum, other natural minerals or the ground powder thereof; metallic powders of aluminium, copper, brass, tin and the like; alumina, titanium oxide, graphite, and carbon black. When the paint is to be stored for a long period of time, the particle size of the inorganic solid powder is preferably as fine as possible, since that having a large particle size impairs its dispersibility into water. The solid powder which has a particle size of about 0.03–100μ and is readily available is generally employed, although there is no lower limit on the particle size. The preferred particle size is generally in the range of about 0.1–50μ. When such inorganic solid powder is used in a primer paint, its particle size is preferably a little larger and the preferred range thereof is about 0.3–100μ.

Incidentally, the powder of mica, vermiculite, aluminium, copper or natural graphite may be in the form of lamina of a polygon, and such laminae can readily be dispersed into water even when a side of the polygon of the lamina is more than 200μ in length. Therefore, the particle size should be considered based on the geometric average of its longitudinal and transverse lengths when such laminae are employed. In the present invention, the particle size of the inorganic powder is especially defined by its geometric average size. In case of the resin particles, the geometric average size is not employed, unless the resin particles are especially of flat or needle-like shapes.

The water-soluble high-molecular suspension agent has the role of the suspension stabilizer of the resin powder and inorganic powder. The agent also serves to increase the viscosity of a dispersed liquid and to facilitate coating operation, as well as to form a stable film when moisture is removed by drying and to prevent the resulting unbaked film from peeling off by means of friction. Such high-molecular suspension agents include those which may be generally employed as a suspension agent in suspension polymerization or as a water-soluble sizing agent, such as water-soluble cellulosic derivatives, e.g. methoxycellulose, ethoxycellulose, hydroxymethoxycellulose, hydroxyethoxycellulose, sodium carboxymethylcellulose; polyvinyl alcohol, polyacrylates or polymethacrylates, e.g. especially the alkali metal salts thereof such as sodium salts, and ammonium salts; polyvinyl pyrrolidone, polyvinyl methyl ether, starch, sodium alginate, gelatin, mannan, pectin, and the like, and mixtures thereof. When the aqueous dispersion paint is stirred upon application, it is not necessarily required for the paint to have a long dispersion stability. The more preferable suspension agent for obtaining the dispersion paint which is stable for a long period of time is an agent of cellulosic derivative type, polyvinyl alcohol and the like.

The concentration of the water-soluble suspension agents is in the range of about 0.1–10% by weight and preferably about 0.2–5% by weight. When the concentration is too low, the viscosity of the solution is decreased, its dispersibility deteriorates, and the film-forming ability of the dried coating film is also decreased. When the concentration is too high, the viscosity of the solution becomes too high, and powder is added to the solution, it is difficult to disperse the powder therein. Even if the powder is dispersed, the viscosity remarkably increases by the addition of the powder and the workability worsens.

The viscosity of a solution of suspension agent varies widely depending on the species of suspension agents, the molecular weight thereof and the like. For example, methoxycellulose may give to a 2% aqueous solution thereof a viscosity of more than several thousands to 10 thousands centipoise. Such agent is preferably employed in a concentration that gives the resulting solution a viscosity of not more than about 5,000 centipoise. The agent such as polyvinyl alcohol gives a lower viscosity as low as several hundreds centipoise to its 10% or more solution, in which powder can readily be dispersed homogeneously. In such case, the concentration is preferably not more than 10%, since the strength of the coating film is lowered when the ratio of the suspension agent to the resin becomes too large. In general, the lower limit of the viscosity of a solution is preferably not less than 10 centipoise from the viewpoint of dispersion stability and film-forming ability. The more preferable viscosity thereof is about 10–1,000 centipoise.

The aqueous dispersion paint can readily be prepared by homogeneously mixing the predetermined amounts of a fluoroethylene resin, inorganic solid powder and an aqueous solution of suspension agent by means of a ball mill, a colloid mill or a high-speed mixer.

The viscosity of the resulting paint dispersion is also an important factor. The viscosity is generally required to be in the range of about 300–5,000 centipoise and preferably about 500–2,500 centipoise, which is measured by a Brookfield spindle No. 3 viscometer at the spindle turning speed of 60 R.P.M.

When the viscosity is too low, the paint which was applied on a steep slope or a perpendicular plane may flow down before drying and a uniform coating cannot be obtained. When the viscosity is too high, coating operation gets into difficulty not only by spraying but also by brushing.

The aqueous dispersion paint is coated by a conventional means such as brush or spray. When it is coated on a metal surface, the metal is preferably subjected, before being coated, to a surface treatment such as a roughing treatment by means of sand-blast or shot-blast to remove rusts therefrom. Then, the coating is dried to remove moisture by exposing it to the outdoor temperature or heating it to a temperature of not higher than 100° C. When the drying is there is formed a primary coating film wherein the resin powder and inorganic solid powder are deposited on the surface of the substrate by the aid of the resulting water-soluble high polymer film binder. The primary film is then baked by heating it to a temperature of not lower than the melting point of the resin and not higher than the decomposition point of the resin by means of a heating oven or hot air. The preferred temperature of heating ranges from the melting point of the resin to about 340° C. Through this baking procedure, the polymer in the coating layer is fused and flows to form a uniform molten film and cover the substrate layer. Incidentally, the water-soluble high polymer may not decrease the waterproof property of the resulting film since it is thermally decomposed and carbonized to lose its hydrophilic property by the baking.

The coating film which is secondarily formed is preferably not less than about 10μ in thickness. When the thickness is less than about 10μ, the film may sometimes lack its continuous property. The upper limit of the thickness is determined mainly from the economical point of view, and the coating of more than 3000μ thick is not generally needed. When the coating is too thick, a curved portion of the coated surface may easily peel off owing to thermal strain between the substrate and the coating film. When the coating is carried out with the aqueous dispersion paint alone, the thickness of the film is preferably about 30–2,000μ.

The thickness of the coating film formed by means of one brushing or spraying operation is generally about several to several tens μ. When a thicker coating is needed, the coating is effected through several operations. The primary film formed by 2 or 3 coating operations may be subjected to baking and such procedures may be repeated. But, it is preferable that formation of the primary film and baking is repeated for each coating operation, since a thicker primary film is apt to cause mud-cracks. If desired, the coating can be carried out by employing two or more aqueous dispersion paints. For example, a dispersion paint containing inorganic solid powder can be used for a primer layer and a paint prepared by dispersing a fluoroethylene resin alone into the aqueous solution of a suspension agent can be applied thereon to make a surface coating.

The coating with an aqueous dispersion coating is a very excellent method in that no organic solvent is employed and its bonding strength to a substrate is superior. But, the method requires a drying step for each coating operation, to remove moisture, since an aqueous dispersion is used. The coating operation is a little more complicated than a powder coating operation, owing to formation of a thinner film per coating and the like. Furthermore, the repeated heating may sometimes cause decomposition of a fluoroethylene resin since there is generally a small difference between the fusion temperature and decomposition temperature of the fluoroethylene resins.

In accordance with another embodiment of the present invention there is provided a novel method for surface coating, which comprises employing the above-mentioned aqueous dispersion paint for primer coating and carrying out a surface coating with the relatively coarse powder of fluoroethylene resins which has been prepared by suspension polymerization, precipitation polymerization employing solvents, bulk polymerization, grinding of molded articles of the resins, and the like.

The method for surface coating with the coarse resin powder is given in the following. A primer layer of about 10–500μ thick is formed by employing an aqueous fluoroethylene resin dispersion paint. The primer film in a molten state is then coated with the coarse powder of a fluoroethylene resin having a particle size of about 10–300μ, which is then subjected to fusion by heating to a temperature of not lower than the melting point of the coarse resin powder and not higher than the decomposition point thereof. Thus, a surface coating layer of about 50–3,000μ thick is formed.

In the above-mentioned method, the aqueous dispersion paint to be employed for the primer coating should contain about 80–40 parts by volume of a fluoroethylene resin and about 20–60 parts by volume of inorganic solid powder which is insoluble in water. The primer layer coated with an aqueous dispersion paint having the above-mentioned composition forms a porous film having a void volume of about 10–40%, and an anti-corrosive surface film coated thereon satisfies both anti-blister property and bonding property. In case that the amount of the inorganic solid powder employed in the aqueous dispersion paint is less than about 20 parts by volume, the resulting primer layer has a smaller void volume and the surface-coated anti-corrosive film is apt to produce blisters when the film is exposed to corrosive circumstances of high temperature and high humidity. In case that the amount of the inorganic solid powder is more than about 60 parts by weight, the resulting anti-corrosive coating film exhibits a weak bonding strength to a metal substrate. In these cases, both the aqueous dispersion paints fail to exhibit the excellent effects on primer coating. The bonding strength to a metal substrate varies depending on the species of the inorganic powder. The most preferable inorganic powder which gives a good bonding property and prevents the resulting film from producing blisters includes the powder of lamina particles of talc, mica, vermiculite, aluminium or the like.

The thickness of the primer layer is preferably about 10–500μ. The primer of less than 10μ may sometimes lack its continuous property and the resulting anti-corrosive coating is apt to peel off. As described above, the coating with an aqueous dispersion paint gives a thinner film than the film obtained by powder coating per one coating operation. Therefore, when a surface coating is carried out by means of powder coating, the primer coating does not need to be as thick as about 500μ. The more preferable thickness of the primer layer is in the range of about 20–300μ. The primer coating can be carried out in the same way as in the coating with an aqueous dispersion paint alone which was mentioned above.

The primer coating is preferably carried out by dividing the procedure into generally two or more operations. In this case, the secondary coating is preferably effected after baking the primary coating film. In other words, when a thick primer layer is needed, a primary coating film which was thickly coated by one operation and dried to remove moisture is apt to produce mud-cracks. In case of a thin primer coating, a more uniform coating film can be obtained by the divided coating operations.

Onto the primer coating in a molten state following the final baking, a coarse fluoroethylene resin powder can be applied by means of a flock coating, a fluidized bed coating, and other known powder coating techniques. The fluoroethylene resin powder applied thereto immediately begins to sinter and form film. A completely continuous surface coating layer is formed by baking the film in a heating oven at a temperature of about 200°–300° C. The thickness of the surface coating layer should be in the range of about 50–3,000μ. When the thickness of the surface coating layer is less than about 50μ the resulting anti-corrosive coating is apt to have pinholes. When the thickness is more than about 3,000μ the resulting coating is liable to peel off owing to thermal strain between the substrate and the primer coating. The preferable thickness of the surface coating layer is in the range of about 100–2,000μ.

Application of the resin powder is preferably divided into two or more operations in order to obtain a surface coating layer of more than about 300μ thick. Otherwise, bubbles may be contained in the surface coating layer which is subjected to baking treatment. When the resin powder is applied by the divided operations, the resin powder applied by each operation is subjected to baking and the application of the resin powder is repeated when the baked resin is substantially in a molten state. The coated substrate is taken out from a heating oven after the final baking of the surface coating is completed, and is cooled to outdoor temperature. Thus, the anti-corrosive coating of the present invention is completed.

The most preferable structure of the anti-corrosive coating film comprises a porous primer coating layer having a void volume of about 10–40% which comprises about 20–60 parts by volume of an inorganic filler and about 80–40 parts by volume of a fluoroethylene thermoplastic resin and is bonded to a substrate, and a surface coating layer having no substantial void which comprises a fluoroethylene thermoplastic resin having the thermal bonding property to the primer coating layer, the resin being identical with or different from the resin employed in the primer coating layer.

The anti-corrosive coating described above does not produce blisters even when the coating surface is exposed to 100° C. steam for 2,000 hours or longer. Whereas, the coating with the fluoroethylene resin powder alone without employing the primer layer of the present invention produces blisters within 10 hours under the same condition. The anti-corrosive coating comprising a primer coating and a surface coating according to the present invention does not produce peeling at the concave surfaces of the substrate and does not deteriorate its bonding strength even with water molecules which permeate through coating film, although its initial bonding strength is rather smaller than that of the coating without primer coating. For example, in the accelerated test in which a coating having slits reaching the surface of metal substrate from the coating surface is immersed in 100° C. water, the anti-corrosive coating according to the present invention maintains its initial peeling strength. From these experimental facts, it is expected that a chemical process apparatus to which the anti-corrosive coating according to the present invention is applied will be durable in use for a long period of time under severe corrosive circumstances of high temperature.

By the fluoroethylene resins to be employed in the present invention is generally meant a homopolymer of a fluoroethylene, a copolymer of two or more fluoroethylenes, a copolymer comprising a major amount (by weight) of one or more fluoroethylenes and a minor amount (by weight) of other monomer or monomers copolymerizable therewith or mixtures of the polymers. The "fluoroethylene" means a derivative of ethylene in which at least one hydrogen atom has been replaced by a fluorine atom: the remaining hydrogens may or may not be further replaced by another halogen such as chlorine. Such fluoroethylenes include trifluoroethylene, vinylidene fluoride, vinyl fluoride, tetrafluoroethylene, trifluoromonochloroethylene, difluoromonochloroethylene, monofluoromonochlorovinylidene and the like. The monomers copolymerizable with a fluoroethylene include a fluoroolefin (except ethylene) such as hexafluoropropylene, heptafluoropropylene, and perfluoroacrylic acid, and an olefin such as ethylene, propylene and butylene. The especially preferable resins are these homopolymers or copolymers having a melting temperature of about 200°–320° C.

The present invention is further explained by way of the following examples. It is to be understood that these examples should not limit the scope of the invention.

EXAMPLE 1

Each of aqueous dispersion paints A, B, C, D, E, F and G was prepared by mixing the following copolymer with the following mica powder in the volume ratio, calculated on the basis of true specific gravity, of 100/0, 90/10, 80/20, 70/30, 60/40, 50/50, and 45/55, respectively, and milling the resulting mixture with the same proportion by weight of a 2% aqueous solution of methoxy cellulose (tradename: Metlose SM-100, supplied by Shinetsu Chemical Industry Co., Ltd., Japan) for 24 hours in a ball mill;

copolymer: ethylene-tetrafluoroethylene equimolar copolymer (containing 78% by weight of tetrafluoroethylene component) having a particle size of about $0.1\mu$, melting point of 265° C. and true specific gravity of 1.69, which was obtained by emulsion polymerization;

mica powder: mica powder consisting of plate-like particles $0.1–1\mu$ thick, $2–150\mu$ in diameter and 2.96 in true specific gravity.

The viscosities of the paints A, B, C, D, E, F and G measured by means of a Brookfiels spindle No. 3 viscometer operated at the spindle turning speed of 60 r.p.m. were 1020, 1060, 980, 940, 1020, 620 and 740 C.P., respectively.

By using the above aqueous disperson paints, a film was formed on one surface each of $100\times100\times4.5$ mm mild steel plates, the surfaces of which had been polished by means of sand-blast, according to the following procedure. An aqueous paint prepared in the above was sprayed onto one surface of the steel plate in such an amount as to form a film about $50\mu$ thick per spraying operation (200–250 g/m$^2$ per operation). The coated plate was air-dried, baked for 40 minutes in a heating oven maintained at 300° C. and then cooled. The above film forming procedure was repeated five times in total when the paint A was employed. On the other hand, when the paint B, C, D, E, F or G was employed, the procedure was repeated three times, followed by repeating the procedure twice by using the paint A in each case.

The uncoated back surface of the coated steel plate sample was connected to one electrode of an ohmmeter. A testing electrode 15 mm in diameter was connected to another electrode of the ohmmeter and applied with the voltage of 1 KV. The surface of the testing electrode, which had been wetted with water, was moved around and in contact with the coated surface of the sample to detect the presence of pinhole. No pinholes was observed on these sample plates.

On the coated surface of each sample were given six slits which reached the steel plate at an interval of 1 cm by means of a knife edge. Then, the coating about 2 cm long from an edge was carefully peeled off along the slits through the bonding surface of the steel plate, followed by measuring the peeling strength of the 1 cm wide coating. The peeling strengths of the samples coated with the paints A, B, C, D, E, F and G were not less than 5 kg/cm, not less than 5 kg/cm, 2.5 kg/cm, 1.7 kg/cm, 1.1 kg/cm, 0.6 kg/cm and 0.4 kg/cm, respectively.

EXAMPLE 2

Each of aqueous dispersion paints H, I and J was prepared by mixing the following copolymer and the following talc powder in the volume ratio of 100/0, 75/25 and 50/50, respectively, and then mixing the resultant blend with a 2% aqueous solution of methoxy cellulose (Metlose SM-100, supplied by Shinetsu Chemical Industry Co., Ltd.) to make the solid content of the resultant mixture 50% by weight, followed by milling it in a ball mill:

copolymer: ethylene-monochlorotrifluoroethylene equimolar copolymer (containing 83% by weight of monochlorotrifluoroethylene component) having a particle size of $0.05–0.14\mu$, melting point of 248° C. and true specific gravity of 1.68, talc powder: talc powder having a particle size of $2–50\mu$ and true specific gravity of 2.84.

The viscosities of the paints H, I and J were measured and were 980, 680 and 700 C.P., respectively.

According to the same procedure as in Example 1, three coating samples were prepared by spraying paint H five times; paint I three times and paint H twice; and paint J three times and paint H twice, respectively. No pinhole was observed in any sample. The peeling strengths of these three samples were not less than 5 kg/cm, 2.0 kg/cm and 0.4 kg/cm, respectively. Preliminary test.

As a preliminary test for examining the relation between the void volume of a primer coating and formation of blisters in the coating, the following test was carried out by employing, as inorganic fillers, plate-like crystals of mica powder having a thickness of 0.1–1μ, a particle size of 2–150μ and true specific gravity of 2.97 and rather flat crystals of talc having a particle size of 2–50μ and true specific gravity of 2.84.

Various kinds of aqueous dispersion were prepared by mixing the tetrafluoroethylene—ethylene equimolar copolymer, which had been obtained by emulsion polymerization, as used in Example 1 with the talc or the mica in various volume ratios, milling the resulting mixtures and the same proportion by weight of 2% aqueous solutions of methoxy cellulose (tradename; Metlose SM-100, supplied by Shinetsu Chemical Industry Co., Ltd.) in a ball mill for 24 hours.

An aluminium foil of 100×150 mm and 50μ in thickness was subjected to the following film forming procedure to give thereon a film about 100μ thick: An aqueous dispersion, which had been prepared by the above procedure, was applied on the aluminium foil in such an amount as to give thereon a film 30–35μ thick. The resulting foil was air-dried, then heated to 300° C. to form a film and cooled. Such operation was repeated three times to form a film about 100μ thick. The coated aluminium foil was treated with an about 10% aqueous solution of hydrochloric acid to dissolve away the aluminium foil. Samples were prepared by cutting out 1.0 cm×10 cm films having uniform thickness from the central portions of the resulting coating films. The weight of each sample was measured. The volume of each sample was calculated based on its thickness and area and then the average of the bulk densities ρm of the samples was calculated on the basis of the volume and the weight of each sample.

After calculating the true specific gravity ρc of the mixture of the resin and the filler used for each coating on the basis of their true specific gravities, the void volume of each sample was calculated according to the following formula:

$$\text{void volume } (\%) = (1 - \rho m/\rho c) \times 100 \ (\%)$$

The results are shown in FIG. 1.

Furthermore, each sample was heated to a temperature of from 20° C. to 70° C. and the lengths thereof before and after heating were measured to calculate the coefficient of linear expansion. The results are shown in FIG. 2.

Incidentally, based on the coefficient of linear expansion for each of mica, talc (both about $1 \times 10^{-5}/°$ C.) and tetrafluoroethylene—ethylene copolymer ($12 \times 10^{-5}/°$ C.), the coefficient of a mixture consisting of these components and having no void was calculated. The results are shown by a dotted line in FIG. 2. It was recognized that the coefficient of linear expansion of a mixture having voids therein largely decreases in comparison with the calculated value of the mixture.

EXAMPLE 3

An aqueous dispersion containing solid content in the proportion of 50% by weight was prepared by blending a 75:25 by volume mixture of the tetrafluoroethylene—ethylene copolymer and the mica powder, which were the same materials as used in the above-mentioned preliminary test, with a 2% aqueous solution of methylcellulose. On one surface of a 100×100×4.5 mm mild steel plate, which had been subjected to a surface treatment by means by sand-blast, was sprayed the above aqueous dispersion in such an amount as to give a film 50μ thick per spraying operation. After air-drying, the resulting plate was baked for 40 minutes in a heating oven maintained at 300° C. Such operation was repeated three times to form a primer film 150μ thick. The void volume of the film was measured to be 23.1%.

The primer thus obtained was then coated with a commercially available tetrafluoroethylene—ethylene copolymer powder having a softening point of 277° C. and a particle size of 10–40μ (tradename; Aflon, supplied by Asahi Glass Company, Ltd., Japan). That is, the steel plate, on which the primer film had been formed, was heated to 300° C. in the heating oven, coated with the Aflon powder in such an amount as to provide a film 300μ thick per spraying operation by means of electrostatic powder spraying and heating again. After repeating the above procedure three times to form a surface coating film 900μ in total thickness, the steel plate was cooled to room temperature.

As a control, a similar surface coating film of Aflon was formed on a mild steel plate without forming a primer coating film.

Pinhole tests were carried out for these coating films in substantially the same way as in Example 1 except for the applied voltage being 10 KV. No pinhole was observed in the films. These samples were then subjected to a blister test and an underwater peeling test under the following condition. The results are shown in Table 1.

Blister Test

A sample was set to allow an uncoated surface to contact with air and a coated surface with steam of 100° C. A period of time until blisters occurred on the coated surface was determined while, in the course of the test, measuring the increase in weight of the sample.

Hot Water Immersion Peeling Test

On a coated surface of a sample six slits were made, which were so deep as to reach the surface of the steel plate and were 1 cm apart from one another, by means of a knife edge. The sample given such slits was immersed in 100° C. hot water and taken out at predetermined intervals of time to measure the peeling strength of the coating 1 cm wide which was located between the two slits. The same measurement was effected on the five samples which had been prepared in the same way and the average value thereof was adopted.

Incidentally, a film was formed on an aluminium foil by using Aflon alone according to the same procedure as in the control example, mentioned above. Void volume of the resulting film was measured. The value was 0.6%, which shows that there is no substantial void in the film.

Table 1

|  | Pinhole | Blister | Peeling strength (kg/cm) | |
|---|---|---|---|---|
|  |  |  | in dry state | in 100° C. water |
| with primer | no | not produced for 2000 hours | 1.3 | 1.3 after 100 hours |
| without primer | no | produced within 24 hours | not less than 5.0 | not more than 0.1 in 10 hours |

A sample having a primer coating was subjected to a long period of peeling strength test. The peeling strength scarcely decreased even after 1000 hours. It was recognized that such sample had durability for more than a longer period of time.

EXAMPLE 4

The same preliminary tests as in the preceding examples were carried out as to the samples which had been prepared by varying the volume ratio of talc powder to the resin as in the preliminary test and carrying out primer coating and surface coating in the same way as in the preceding examples. The results are shown in Table 2.

Table 2

| Resin/talc (Volume ratio) | Void Volume (%) | Pinhole | Blister (for 2000 hours) | Peeling strength (kg/cm) | |
|---|---|---|---|---|---|
|  |  |  |  | in dry state | in 100° C. water, after 100 hours |
| 90/10 | 7.8 | no | produced innumerably in 120 hours | not less than 5.0 | not more than 0.1 in 10 hours |
| 80/20 | 10.8 | no | slightly produced | 2.1 | 2.1 |
| 70/30 | 15.3 | no | not produced | 1.4 | 1.4 |
| 60/40 | 24.1 | no | not produced | 0.8 | 0.8 |
| 50/50 | 34.8 | no | not produced | 0.4 | 0.4 |
| 45/55 | 40.1 | no | not produced | 0.2 | 0.2 |

EXAMPLE 5

A trifluoromonochloroethylene—ethylene equimolar copolymer having a particle size of about $0.1\mu$, true specific gravity of 1.68 and softening temperature of 248° C. prepared by emulsion polymerization was used.

An aqueous dispersion containing solid content in the proportion of 50% by weight was prepared by mixing a 80:20 volume ratio mixture of the above emulsion polymerization copolymer and mica powder with a 2% aqueous solution of methoxy cellulose.

Using the aqueous dispersion thus obtained, primer coating was formed on a substrate according to the same procedure as in Example 1. Then, surface coating was carried out according to the powder coating procedure as employed in Example 1 by using commercially available trifluoromonochloroethylene—ethylene equimolar copolymer powder having a softening temperature of 249° C., a particle size of $70-100\mu$ and a density of 1.68 (tradename; Harler 5004, supplied by Allied Chemical Company).

As a control example, powder coating with Harler alone was carried out without primer coating. The test results are shown in Table 3.

Table 3

|  | Void volume (%) | Pinhole | Blister | Peeling strength (kg/cm) | |
|---|---|---|---|---|---|
|  |  |  |  | in dry state | in 100° C. water after 100 hours |
| with primer | 19.1 | no | not produced in 2000 hours | 1.6 | 1.6 |
| without primer | 0.6 | no | produced within 24 hours | not less than 5.0 | not more than 0.1 in 10 hours |

EXAMPLE 6

An aqueous dispersion containing 50% by weight of solids was prepared by mixing polyvinylidene fluoride powder having a particle size of $0.2-0.4\mu$ and a density of 1.73, which had been prepared by emulsion polymerization, with mica powder (the same powder as used in the preliminary test) in the volume ratio 75:25.

Using the aqueous dispersion thus obtained, primer coating was carried out according to the same procedure as in Example 1. Then, surface coating was carried out according to the same coating procedure as in Example 1 by using polyvinylidene fluoride powder having a particle size of $50-250\mu$, which had been prepared by suspension polymerization (Kureha KF #1100, supplied by Kureha Kagaku Kogyo K.K., Japan).

As a control example, a powder coating was carried out by using Kureha KF #1100 alone without primer coating. The result are shown in Table 4.

Table 4

|  | Void volume | Pinhole | Blister | Peeling strength (kg/cm) | |
|---|---|---|---|---|---|
|  |  |  |  | in dry state | in 100° C. water, after 100 hours |
| with Primer | 21.8 | no | not produced for 2000 hours | 1.5 | 1.5 |
| without Primer | 0.5 | no | produced within 24 hours | not less than 5.0 | not more than 0.1 in 10 hours |

EXAMPLE 7

A homogeneous aqueous dispersion paint was prepared by milling, for 24 hours in a ball mill, 100 parts by weight of polyvinylidene fluoride of $\eta_{inh}$ 1.34 and having a particle size of 0.35μ, which had been prepared by emulsion polymerization, 200 parts by weight of copper powder (consisting of plate-like particles 1-10μ thick, 10-100μ in lamina diameter and about 58μ in the average diameter which was calculated on the basis of the volume of the maximum particles), and 300 parts by weight of a 2% aqueous solution of methoxy cellulose (Metloss SM-100).

On one surface of a 100×100×4.5 mm mild steel plate, from which rusts had been removed by means of sand-blast, the above aqueous dispersion paint was applied by spray-coating in such an amount as to provide a film 50μ thick per spraying operation. After air-drying, the resulting plate was baked in a heating oven maintained at 250° C. for 40 minutes. Such procedure was repeated three times to form a primer film 150μ thick.

The primer coated plate thus obtained was then coated with the copolymer powder (the average particle size 120 $\eta_{inh}$ 1.0) consisting of 95% by weight of vinylidene fluoride and 5% by weight of trifluoromonochloroethylene and having been obtained by suspension polymerization. That is, the steel plate having the primer coating thereon was heated to 260° C., coated with the above-mentioned copolymer in such an amount as to provide a film 0.3 mm thick per coating operation in accordance with a fluidized bed coating and again heated. Such operation was repeated three times to obtain a finish coating 0.9 mm thick.

The bonding strength of the resulting film was in the range of 0.8-1.5 kg/cm. When the film was subjected to a blister test, blisters did not occur therein for a test period of not less than 1000 hours and the bonding strength did not deteriorate.

Incidentally, a film was formed on an aluminium foil by using the same aqueous dispersion paint alone. The measured void volume of the resulting sample was 27.2%.

What is claimed is:

1. A method for coating with a fluoroethylene resin which comprises
   (a) coating, directly on the surface of a metal substrate, an aqueous fluoroethylene resin dispersion paint consisting essentially of a particulate fluoroethylene resin having a particle size of about 0.03-2μ, an inorganic solid powder which is substantially water-insoluble and has a geometric average particle size of about 0.03-100μ, and an aqueous medium, the particulate resin and inorganic powder being employed in a volume ratio of about 40-80/60-20, said aqueous medium being an aqueous solution containing about 0.1-10% by weight of a water soluble high-molecular suspension agent which functions to prevent the subsequently dried coating from peeling off the substrate by means of friction, the solid content in the paint being about 10-60% by weight, with the proviso that no organic liquid is employed in said dispersion paint,
   (b) drying the paint coating,
   (c) heating the thus coated surface of the substrate to a temperature not lower than the fusion temperature of the fluoroethylene resin, thereby thermally decomposing and carbonizing the water soluble high-molecular suspension agent and forming a primer layer about 10-500μ thick on the substrate, said primer layer having a void volume of 10-40%,
   (d) coating the primer layer, which is in a molten state, with a fluoroethylene resin powder having a particle size of about 10-300μ, which can undergo deposition on the primer layer, and
   (e) heating the resin layer powder coating to a temperature not lower than the fusion temperature of the resin powder to form a surface coating layer about 50-3000μ thick.

2. A method as set forth in claim 1, wherein the suspension agent is selected from the group consisting of methoxycellulose, ethoxycellulose, hydroxymethoxycellulose, hydroxyethoxycellulose, sodium carboxymethylcellulose, polyvinyl alcohol, a polyacrylate, a polymethacrylate, polyvinyl pyrrolidone, polyvinyl methyl ether, starch, sodium alginate, gelatin, mannan, pectin, and a mixture thereof.

3. A method as set forth in claim 1, in which the particulate fluoroethylene resin having a particle size of about 0.03-2μ is obtained by emulsion polymerization and the fluoroethylene resin powder having a particle size of about 10-300μ is obtained by suspension polymerization.

4. A method as set forth in claim 1, in which the procedure of coating the substrate with the aqueous dispersion paint and heating the coated surface is repeated.

5. A method as set forth in claim 1, in which the procedure of coating the primer layer with a fluoroethylene resin powder and heating the resin powder coating is repeated.

6. A method as set forth in claim 1, in which the fluoroethylene resin is selected from the group consisting of a fluoroethylene homopolymer, a copolymer of fluoroethylenes, a copolymer comprising a major amount of at least one fluoroethylene, and the mixtures thereof.

* * * * *